United States Patent
Savicki, Jr.

(10) Patent No.: US 9,444,238 B1
(45) Date of Patent: Sep. 13, 2016

(54) TORSION RESISTANT ELECTRICAL WIRING DEVICE

(71) Applicant: Pass & Seymour, Inc., Syracuse, NY (US)

(72) Inventor: Gerald R. Savicki, Jr., Canastota, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 14/705,249

(22) Filed: May 6, 2015

(51) Int. Cl.
| | |
|---|---|
| *H01H 9/02* | (2006.01) |
| *H01H 13/04* | (2006.01) |
| *H05K 5/03* | (2006.01) |
| *H02G 3/32* | (2006.01) |
| *H02G 3/14* | (2006.01) |
| *H02G 3/08* | (2006.01) |

(52) U.S. Cl.
CPC ............... *H02G 3/32* (2013.01); *H02G 3/086* (2013.01); *H02G 3/14* (2013.01)

(58) Field of Classification Search
CPC .......... H02G 3/32; H02G 3/14; H02G 3/086
USPC ............................................ 174/53, 58, 66
See application file for complete search history.

(56) References Cited

U.S. PATENT DOCUMENTS

| | | | | |
|---|---|---|---|---|
| 7,938,676 | B1 * | 5/2011 | Patel .................... | H01Q 1/2233 439/137 |
| 2003/0121765 | A1 * | 7/2003 | Savicki, Jr. ............ | H01H 23/04 200/296 |
| 2008/0156512 | A1 * | 7/2008 | Castaldo ............ | H01R 13/4534 174/53 |

* cited by examiner

*Primary Examiner* — Sherman Ng
(74) *Attorney, Agent, or Firm* — Bond, Schoeneck & King, PLLC (57) ABSTRACT

An electrical wiring device includes a device housing that has a front cover having a user-accessible portion having at least one set of receptacle openings formed therein. The housing also includes a back body having a major rear surface. A mounting strap includes a central strap portion. A stabilization structure includes a plurality of shutter stabilization elements coupled to the central strap portion and disposed in a substantially balanced array around the central strap portion. The plurality of shutter stabilization elements extends through the back body to form a three-dimensional reinforcing structure that rigidly interconnects the user-accessible portion and the major rear surface.

32 Claims, 9 Drawing Sheets

TORSION RESISTANT ELECTRICAL WIRING DEVICE

BACKGROUND OF THE INVENTION

1. Field of the Invention

The present invention relates generally to electrical wiring devices, and particularly to an electrical wiring device with a rigid substantially non-deformable housing.

2. Technical Background

Any structure that is equipped with electric service typically includes one or more electric circuits installed throughout. An electric circuit is comprised of electrical wiring that is disposed between the panel box and locations where service is desired. Moreover, the wiring interconnects various kinds of electrical wiring devices—such as electrical receptacles—that are disposed at the various service locations. In addition to electrical receptacle devices, protective electrical wiring devices such as GFCIs, AFCIs, TVSS devices and the like often include one or more electrical outlets that provide access to AC power. Moreover, there are devices that are configured to mix-and-match electrical outlets with other electrical functions such as USB ports, low voltage ports, night lights, dimming or fan speed controls, occupancy sensing, and/or remote communication devices.

In any event, once an electrical wiring device is properly terminated by the electrical wiring, it is disposed in a device box and a cover plate is installed. Electrical wiring devices often have a screw hole disposed at a central portion thereof; the screw hole is configured to receive a cover plate screw that fastens the cover plate to the wiring device. As those skilled in the art will appreciate, the cover plate "completes the enclosure" by preventing user access to the interior of the device box so that no energized wires or electrical conductors are accessible to a user. In other words, the cover plate serves an important safety function by preventing inadvertent shock or electrocution by touching exposed wiring.

Another shock/electrocution safety issue relates to the propensity of toddlers and young children to insert various objects (such as paper clips, screwdriver blades, etc.) into the receptacle contact openings of a wiring device. In order to prevent this scenario from playing out, shutter devices are typically installed within electrical receptacles. Specifically, shutters are configured to allow corded plug blades from being inserted while, at the same time, preventing foreign objects from being inserted into the receptacle openings and making contact with live contacts disposed therewithin.

Figure 1A:
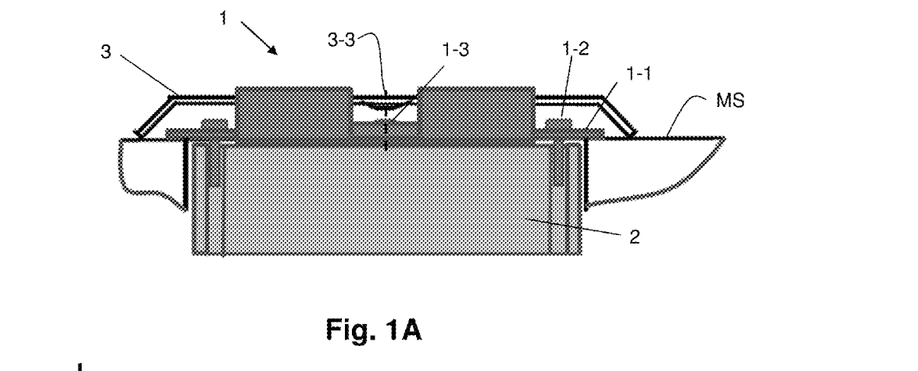
FIGS. 1A-1C are diagrammatic depictions of electrical wiring device installations.
Figure 1B:
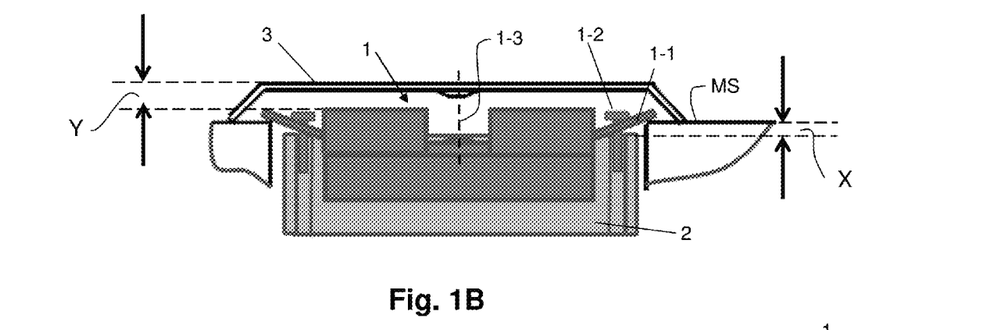
Figure 1C:
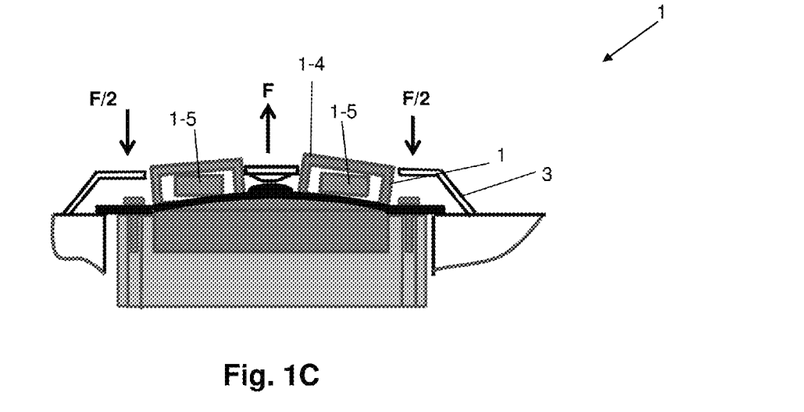

A problem arises during a sequence of events that has occurred during device installation. As shown in FIGS. 1A-1C, a device box has been attached to a mounting surface such as a wall stud, ceiling joist, or counter-top. Wires are routed through openings in the device box, their ends sticking out of the open front face of the box. Sheet rock or some overlay material is installed having a cutout. The wire ends extend from the cutout and get fastened to the wiring device. With all wire ends terminated, the wiring device is pushed through the cutout into device box where it is secured to the device box with mounting screws. Then a cover plate is attached to the wiring device using the central screw.

Referring to FIGS. 1A-1C, diagrammatic depictions of electrical wiring device installations are shown. In FIG. 1A, a device box 2 is disposed in an appropriately sized opening in a mounting surface MS (e.g., a wall) and is essentially flush with it. The mounting ears 1-1 of the electrical wiring device 1 are also flush with the mounting surface MS. The device 1 includes a center screw member 1-3 that holds the cover and the back body portion together. Moreover, the center screw 1-3 includes a central tap that is configured to accommodate the screw for the cover plate 3. In FIG. 1B, the opening in the mounting surface MS is too large and, moreover, the device box is too deep within the mounting surface. In this case, there is gap "x" between the wall or mounting surface and the device box such that a force, or stress, is applied to the mounting ears 1-1 in the manner shown. There is another gap "y" between the cover plate 3 and the top surface of the electrical wiring device 1.

Referring to FIG. 1C, the significance of the gaps (x, y) caused by a misaligned or poor installation is shown. As noted above, the cover plate 3 is attached to the wiring device 1 by a center screw. The center screw applies a force "F" of about forty (40) pounds to the center of the wiring device. When the mounting ears are fastened to the device box 2, an opposing force (F/2), or about half of the center force, is applied at each end of the device 1 where the mounting ears are fastened to the device box 2. As a result of the stresses applied by the installation misalignment shown in FIG. 1B, the front cover 1-4 of the device 1 can become distorted so that the shutter elements 1-5 become jammed or misaligned with the plug blade apertures formed in the front cover 1-4.

Figure 2A:
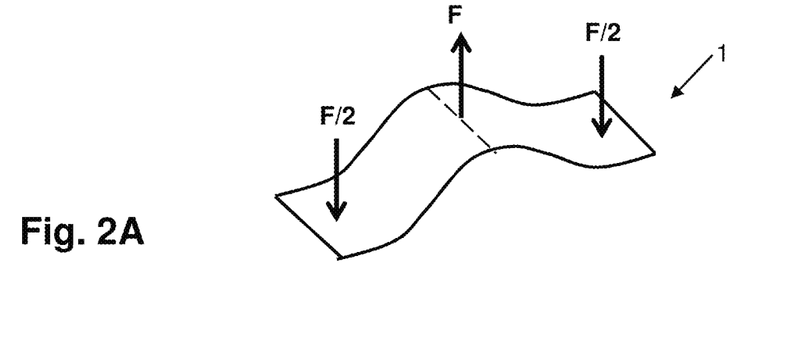
FIGS. 2A-2C are diagrammatic depictions illustrating the forces applied to the wiring devices depicted in FIGS. 1A-1C.
Figure 2B:
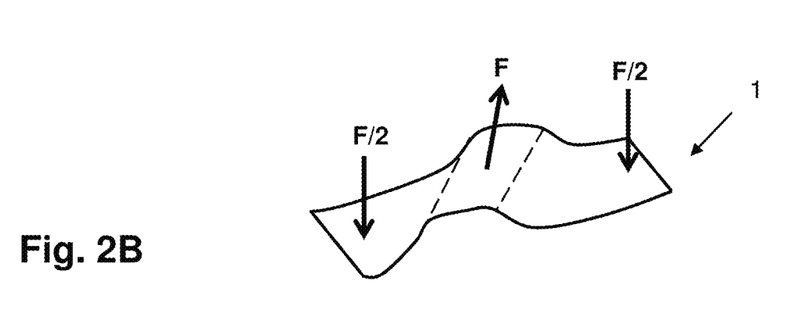
Figure 2C:
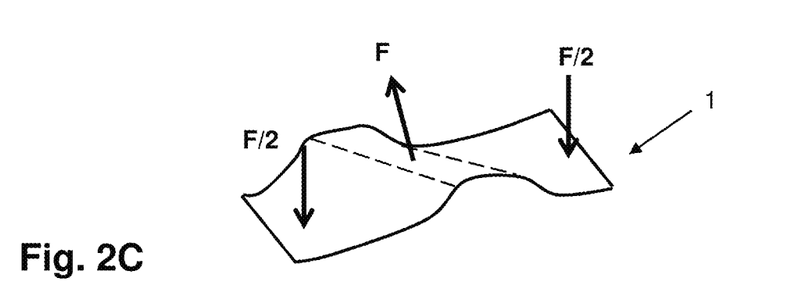

In reference to FIGS. 2A-2C, diagrammatic depictions illustrating the forces applied to the wiring devices depicted in FIGS. 1A-1C are shown. FIGS. 2A-C are exaggerated somewhat to clearly show the types of forces that can be applied to the device if it is misaligned or installed incorrectly. To be specific, bending and/or twisting forces can be applied to the electrical wiring device 1 depending on the way the device and the device box are installed. As noted above, when these bending and/or twisting forces are applied to the electrical wiring device, the shape of the electrical wiring device housing can be distorted and damaged.

Referring back to FIG. 1C, when the electrical wiring device housing is distorted and/or damaged from the aforementioned stresses, the user may attempt to insert a corded plug blade set into the receptacle outlet only to find that the tamper-resistant shutters have been misaligned, and hence, jammed by the applied forces. When the installation misalignment is severe, the damage can result in the loss of both structural and electrical integrity. This condition could further result in poor electrical connections.

In one approach that has been considered, the plastic cover portion and back body portion are welded, snapped, or otherwise fastened together to provide additional rigidity. However, these approaches have been found to be generally unreliable due to plastic creep, cracking, manufacturing variables, or environmental conditions. In other words, the relentless forces applied by the central attachment screw and the mounting ear screws is often greater than the strength of the plastic materials used to fasten the cover portion to the back body.

In another approach that has been considered, the conductive ground strap is wrapped around the back body of the wiring device. One drawback to this approach is that it is not cost effective (specifically, this approach results in a relatively thick wiring device and it also requires a ground buss to be formed between the rear exterior portion of the strap to the receptacle ground terminals). Moreover, the wrap-around strap is no guarantee that the reliability issues due to plastic creep, cracking, manufacturing variables, or environmental conditions will not occur nonetheless.

What is needed is a reliable and cost-effective wiring device that can withstand the forces applied by device installation misalignments. What is also needed is a structural element—in an electrical wiring device—that can contend with and resist bending and twisting forces that are often applied device installation misalignments. What is further needed is a structural element that is configured to provide enough rigidity to the electrical wiring device in a plane substantially parallel to the cover plate.

SUMMARY OF THE INVENTION

The present invention addresses the needs described above by providing a reliable and cost-effective wiring device that can withstand the forces applied by device installation misalignments. The present invention also addresses the needs described above by providing a structural element that can contend with and resist bending and twisting forces that are often applied to an electrical wiring device by installation misalignments. The present invention further addresses the needs described above by providing a structural element that is configured to provide sufficient rigidity to the electrical wiring device in a plane substantially parallel to the cover plate.

One aspect of the present invention is directed to an electrical wiring device configured to be mounted to or disposed in a device box, the electrical wiring device being further configured to accommodate a cover plate, the cover plate being affixed to the device by a fastening screw, the device comprising. A device housing includes a front cover having a user-accessible portion that includes a cover screw hole disposed in a center device portion, the cover screw hole being configured to accept the fastening screw, the user-accessible portion including at least one set of receptacle openings formed therein, the device housing also including a back body having a major rear surface. An electrically conductive mounting strap is disposed between the front cover and the back body, the mounting strap including a central strap portion and two mounting ears disposed at opposite ends of the mounting strap, the mounting ears being configured to mount or affix the device to the device box, the central portion having a strap screw-hole configured to accept the fastening screw. An electrical circuit assembly includes at least one set of electrical receptacle contacts having a hot receptacle contact and a neutral receptacle contact, the at least one set of electrical receptacle contacts being accessible via the at least one set of receptacle openings. At least one shutter assembly is disposed between the at least one set of receptacle openings and the at least one set of electrical receptacle contacts. A shutter stabilization structure includes at least one shutter stabilization element coupled to the central strap portion, the at least one shutter stabilization element being disposed proximate the strap screw-hole and interconnected with the back body to substantially reinforce the center device portion between the user-accessible portion and the major rear surface.

In one embodiment of the device, an end portion of each shutter stabilization element is accessible via a pocket formed in the major rear surface of the back body.

In one version of the embodiment, each stabilization element includes a connective tab portion that is configured to fasten the stabilization element to a portion of the pocket.

In another version of the embodiment, each stabilization element includes a connective tab portion that includes a snap-in element configured to mate with a corresponding portion formed in the pocket.

In another embodiment of the device, each shutter stabilization element extends through the back body to form a three-dimensional structure that is disposed between the user-accessible portion and the major rear surface.

In another version of the embodiment, the at least one shutter stabilization element includes a balanced array of shutter stabilization elements that are aligned with the strap screw-hole and disposed askew with respect to a major longitudinal axis of the mounting strap.

In another version of the embodiment, the balanced array of shutter stabilization elements includes three stabilization elements or four shutter stabilization elements.

In another version of the embodiment, the balanced array of shutter stabilization elements is integrally formed with the central strap portion.

In another embodiment of the device, the at least one shutter stabilization element is integrally formed with the central strap portion.

In another embodiment of the device, the shutter stabilization structure includes a plurality of flexible post members formed in the back body, each of the plurality of flexible post members being coupled to a corresponding shutter stabilization element.

In another version of the embodiment, the at least one shutter stabilization element include a first bearing lateral extension portion and a second bearing lateral extension portion disposed on opposite sides of the center strap portion, the first bearing lateral extension portion and the second bearing lateral extension portion being configured to mate with corresponding ones of the plurality of flexible post members.

In another embodiment of the device, the at least one shutter stabilization element includes at least one first stanchion and at least one second stanchion connected to the center strap portion, the at least one first stanchion and at least one second stanchion being configured to mate with corresponding channels formed in the back body member to form a substantially balanced reinforcing array around the strap screw-hole.

In another embodiment of the device, the at least one set of receptacle openings includes two sets of receptacle openings disposed at opposite ends of the device so that the fastening screw is disposed therebetween, and wherein the at least one set of electrical receptacle contacts includes two sets of electrical receptacle contacts.

In another embodiment of the device, the user-accessible portion includes one set of receptacle openings and a user interface portion, the user interface portion being selected from a group of user interface portions that include a night light, a switch, a low voltage port, or a USB port.

In another embodiment of the device, the central strap portion includes an aperture structure configured to accommodate a user-interface element disposed on the user-accessible portion.

In another version of the embodiment, the aperture structure is configured to accommodate a toggle switch actuator.

In another embodiment of the device, the at least one shutter assembly is configured to move between a closed position and an open position when the at least one shutter assembly is engaged by an electrical outlet plug that includes a hot plug blade and a neutral plug blade, the hot plug blade and the neutral plug blade being allowed to pass through the shutter assembly and mate with the hot receptacle contact and the neutral receptacle contact in the open position, and wherein the shutter assembly is configured to remain in the closed position when engaged by a foreign object that is inserted into one opening of the at least one set of receptacle openings.

In another embodiment of the device, the shutter stabilization structure includes the fastening screw.

In another aspect, the present invention includes an electrical wiring device that includes a device housing that has a front cover having a user-accessible portion that includes at least one set of receptacle openings formed therein, the device housing also including a back body having a major rear surface. A mounting strap is disposed between the front cover and the back body, the mounting strap including a central strap portion and two mounting ears disposed at opposite ends of the mounting strap. An electrical circuit assembly includes at least one set of electrical receptacle contacts, each set of electrical receptacle contacts including a hot receptacle contact and a neutral receptacle contact, the at least one set of electrical receptacle contacts being accessible via the at least one set of receptacle openings. A stabilization structure including a plurality of shutter stabilization elements coupled to the central strap portion and disposed in a substantially balanced array around the central strap portion, the plurality of shutter stabilization elements extending through the back body to form a three-dimensional reinforcing structure that rigidly interconnects the user-accessible portion and the major rear surface.

In one embodiment of the device, the balanced array of stabilization elements includes at least two stabilization elements that are aligned with the strap screw-hole and disposed askew with respect to a major longitudinal axis of the mounting strap.

In one embodiment of the device, the balanced array of stabilization elements includes three stabilization elements or four stabilization elements.

In one version of the embodiment, each of the balanced array of stabilization elements is integrally formed with the central strap portion.

In another embodiment of the device, an end portion of each stabilization element is accessible via a pocket formed in the major rear surface of the back body.

In one version of the embodiment, each stabilization element includes a connective tab portion that is configured to fasten the stabilization element to a portion of the pocket.

In another version of the embodiment, each stabilization element includes a connective tab portion that includes a snap-in element configured to mate with a corresponding portion formed in the pocket.

In another embodiment of the device, the stabilization structure includes a plurality of flexible post members formed in the back body, each of the plurality of flexible post members being coupled to a corresponding stabilization element.

In another embodiment of the device, the plurality of stabilization elements include at least one first stanchion and at least one second stanchion being connected to the center strap portion, the at least one first stanchion and at least one second stanchion being configured to mate with corresponding channels formed in the back body member to form the substantially balanced reinforcing array.

In another embodiment of the device, the device further comprises at least one shutter assembly disposed between the at least one set of receptacle openings and the at least one set of electrical receptacle contacts.

In another version of the embodiment, the at least one shutter assembly is configured to move between a closed position and an open position when the at least one shutter assembly is engaged by an electrical outlet plug that includes a hot plug blade and a neutral plug blade, the hot plug blade and the neutral plug blade being allowed to pass through the shutter assembly and mate with the hot receptacle contact and the neutral receptacle contact in the open position, and wherein the shutter assembly is configured to remain in the closed position when engaged by a foreign object that is inserted into one opening of the at least one set of receptacle openings.

In another embodiment of the device, the stabilization structure includes a fastening screw configured to be threaded into both a central screw formed in the front cover and a strap screw hole formed in the central strap portion.

In another embodiment of the device, the shutter stabilization structure includes a plurality of flexible post members formed in the back body, each of the plurality of flexible post members being coupled to a corresponding shutter stabilization element.

In another version of the embodiment, the at least one shutter stabilization element include a first bearing lateral extension portion and a second bearing lateral extension portion disposed on opposite sides of the center strap portion, the first bearing lateral extension portion and the second bearing lateral extension portion being configured to mate with corresponding ones of the plurality of flexible post members.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electrical wiring device of the present invention is shown in FIG. 3, and is designated generally throughout by reference numeral 10.

Figure 3:
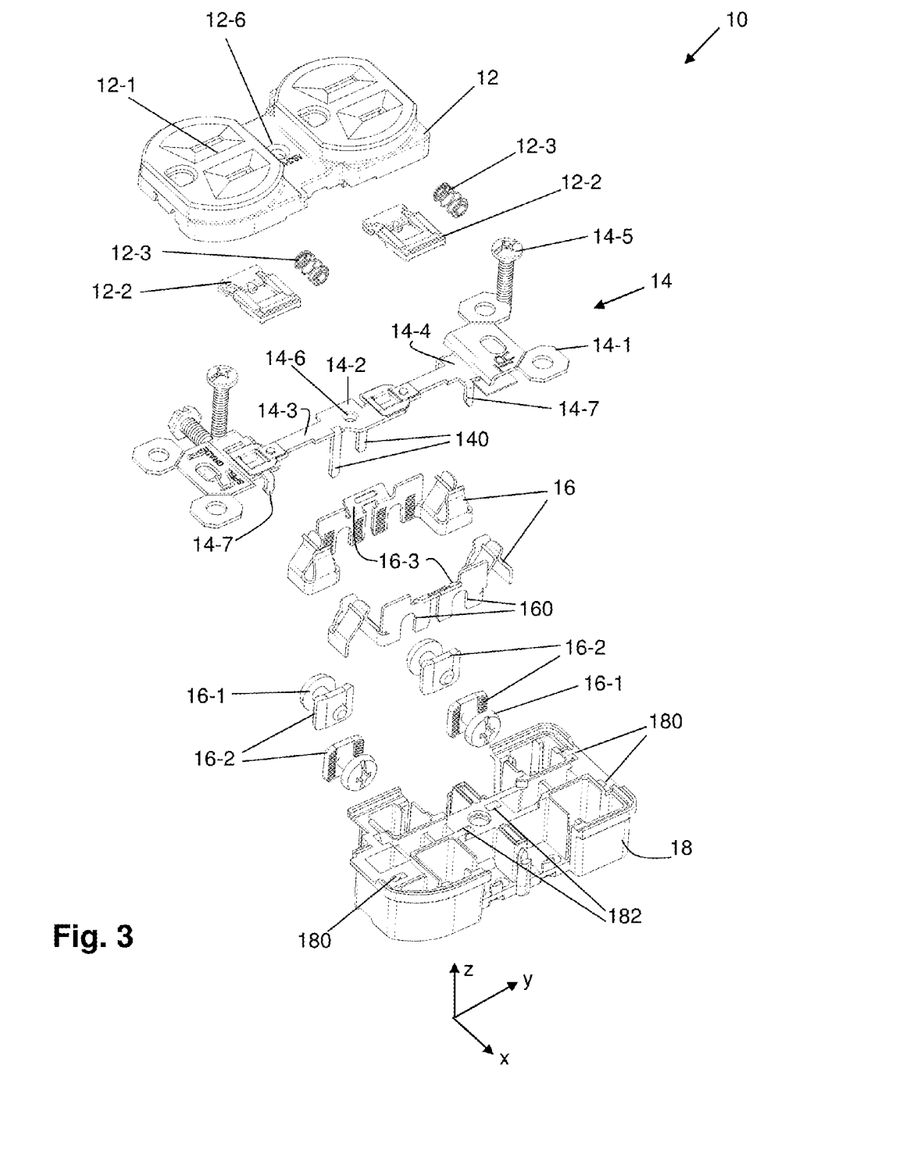
FIG. 3 is an exploded view of the electrical device in accordance with the present invention.

As embodied herein, and depicted in FIG. 3, an exploded view of the electrical device in accordance with the present invention is disclosed. The electrical wiring device 10 includes a front cover portion 12 that includes a user interface 12-1 disposed at either end thereof. In this example, the user interface is implemented by two sets of outlet receptacle openings 12-1. The front cover 12 also includes two shutter elements 12-2 that are disposed within the front cover. Specifically, each shutter is disposed between a set of outlet receptacle openings 12-1 and the corresponding receptacle contacts 16. The receptacle contacts 16 are disposed within the back body member 18 and include terminal openings 160. Each terminal opening mates with a terminal set that includes a pressure plate 16-2 and a terminal screw 16-1. Each shutter is moved between a blocking position and an opened position by compression spring elements 12-3. Reference is made to U.S. Pat. Nos. 8,568,152; 8,187,012; 8,737,025; 7,312,963; 7,179,992; 7,355,117; 7,026,895; and 7,312,394, which are incorporated herein by reference as though fully set forth in its entirety, for a more detailed explanation of various tamper-resistant electrical wiring devices and tamper-resistant shutter elements.

The back body member 18 is also configured to accommodate a ground strap portion 14, which is disposed between the receptacle contacts 16 within the back body member 18. The mounting strap 14 includes a strap spine portion 14-3 that includes a relatively wide center portion 14-2 and relatively wide end portions 14-4. The center portion 14-2 accommodates a ground receptacle contact and one end portion 14-4 typically accommodates a second ground receptacle contact, depending on the wiring device type. The end portions 14-4 may also include a strap registration element 14-7 that is conventionally used to register the strap 14 within the openings 180 formed in the back body 18.

The center portion 14-2 also includes a plurality of shutter stabilization elements 140 disposed are coupled to the center strap portion 14-2 and disposed in a substantially balanced array around the strap center screw hole 14-6 to form a shutter stabilization structure that resists the bending, torsional and tension forces identified in the Background Section. Specifically, the balanced array positions the stanchions, or stabilization elements 140, around the center screw hole 14-6 to substantially distribute the stresses applied to the stabilization structure. Thus, the shutter stabilization structure may include two stanchions 140 substantially aligned with the center screw as shown in the drawing figure, or three stanchions disposed around the center screw hole 14-6. In another embodiment, the structure stabilization can include four stanchions 14-6 disposed around the center screw-hole 14-6.

As shown herein, the center screw 12-60 (See, e.g., FIG. 8A) is threaded through the central screw hole 12-6 and the screw hole 14-6 of the strap 14 to affix the front cover 12 to the strap 14. One shutter stabilization element 140 is disposed on one side of the screw 12-60 and the other shutter stabilization element 140 is disposed on the other side of the screw 12-60; the shutter stabilization elements 140 are disposed in the openings 182 formed in the back body 18. Moreover, the shutter stabilization elements 140 extend substantially through the entire width of the back body 18. Those skilled in the art will appreciate that the shutter stabilization elements 140 are disposed in a three dimensional alignment with the screw 12-60 so that the housing (12/18) maintains rigidity when under installation misalignment stresses. As its name suggests, the shutter stabilization structure (14-2, 12-60, and 140s) provides the shutters 12-2 with a dimensionally stable environment even in the presence of installation misalignment stresses.

Figures 4, 5:
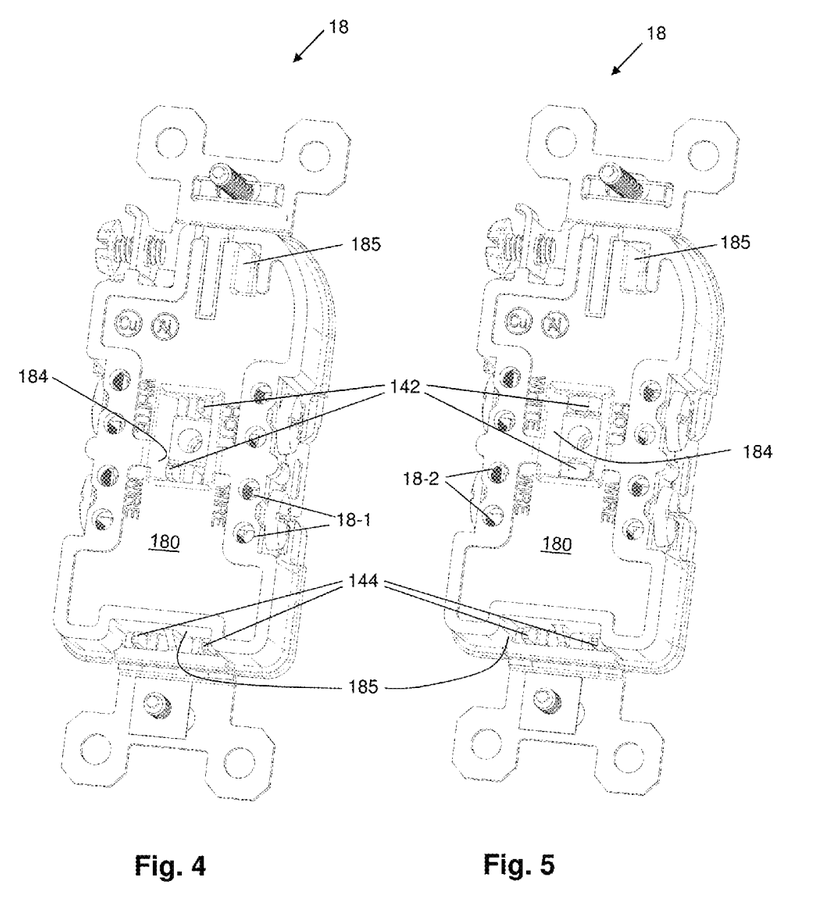
FIG. 4 is an isometric view of the electrical wiring device depicted in FIG. 3.
FIG. 5 is an isometric view of an electrical wiring device in accordance with an alternate embodiment of the present invention.

Referring to FIG. 4, an isometric view of the electrical wiring device 10 depicted in FIG. 3 is disclosed. In particular, FIG. 4 shows the rear major surface 180 of the back body 18. More specifically, the rear major surface 180 further includes an access port 184 that provides access to the tips of the shutter stabilization elements 140 as they emerge from port 184 formed in the back body 18. In this embodiment of the present invention the tips of the shutter stabilization elements 140 are configured to be inserted into channels 182. In an alternate embodiment of the invention, the tips of the shutter stabilization elements can be configured to snap into the channel to substantially prevent the ground strap 14 from being pulled apart from the back body member 18. The back body 18 includes wire terminal openings 18-1 and 18-2 that are configured to direct the hot wires and the neutral wires, respectively, to the wire terminals 16-1 and 16-2, respectively.

Referring to FIG. 5, an isometric view of an electrical wiring device in accordance with an alternate embodiment of the present invention is disclosed. FIG. 5 is an alternate embodiment of the device depicted in FIG. 3, and like FIG. 4, the rear major surface 180 of the back body 18 is shown. In this embodiment of the present invention the tips of the shutter stabilization elements 140 are configured to be crimped, or bent over, within access port 184 when the shutter stabilization element tip emerges from the channels 182. The bent-over, or crimped, shutter stabilization element tips substantially prevent the ground strap 14 from being pulled apart from the back body member 18.

Figures 6A, 6B:
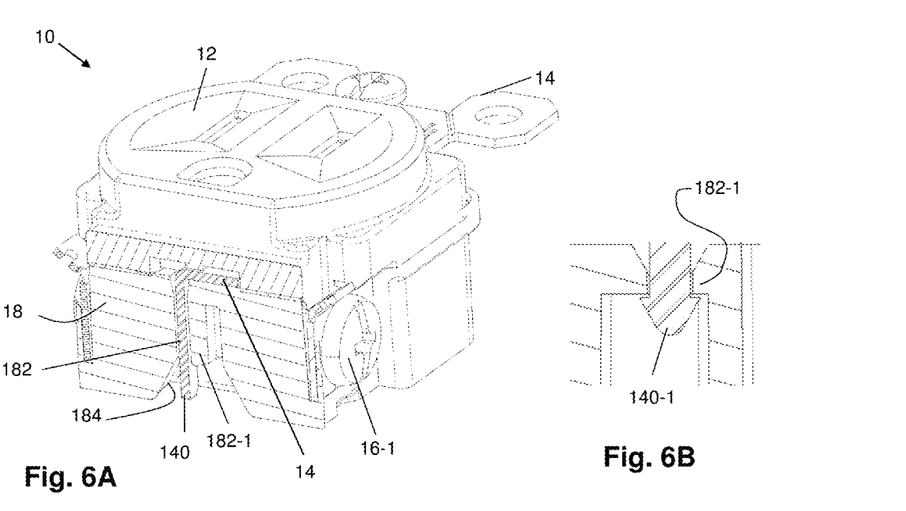
FIGS. 6A-B include detail cross-sectional views of the device depicted in FIG. 4.

FIGS. 6A-B include detail cross-sectional views of the device depicted in FIG. 4. Referring to FIG. 6A, a detail cross-sectional view of the device depicted in FIG. 4 is disclosed. This view shows the shutter stabilization element disposed within the channel 182 and emerging into the access port 184 formed in the rear major surface of the back body member 18.

FIG. 6B shows an alternative snap-in embodiment. As shown herein, the shutter stabilization element 140 may include a nub portion 140-1, or an angled nub portion, disposed on the tip that is configured to be captured by the post 182-1. Once the shutter stabilization element is forced through the channel 182, the nub portion 140-1 substantially prevents the shutter stabilization element 140 from being pulled out of the channel 182.

Figure 7:
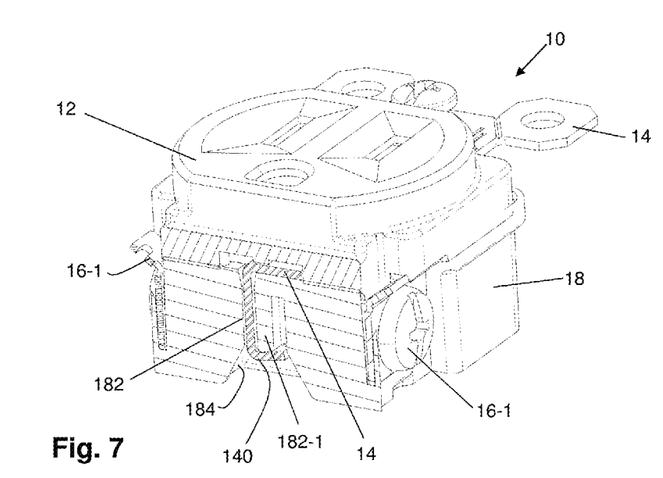
FIG. 7 is a detail cross-sectional view of the device depicted in FIG. 5.

Referring to FIG. 7, a detail cross-sectional view of the device depicted in FIG. 5 is disclosed. This view shows the shutter stabilization element disposed within the channel 182 and emerging into the access port 184 formed in the rear major surface of the back body member 18. In this embodiment, the shutter stabilization element tip is bent over the channel port 182-1 so that once the shutter stabilization element is forced through the channel 182; the bent portion substantially prevents the shutter stabilization element post 142 from being pulled out of the channel 182.

Figures 8A, 8B:
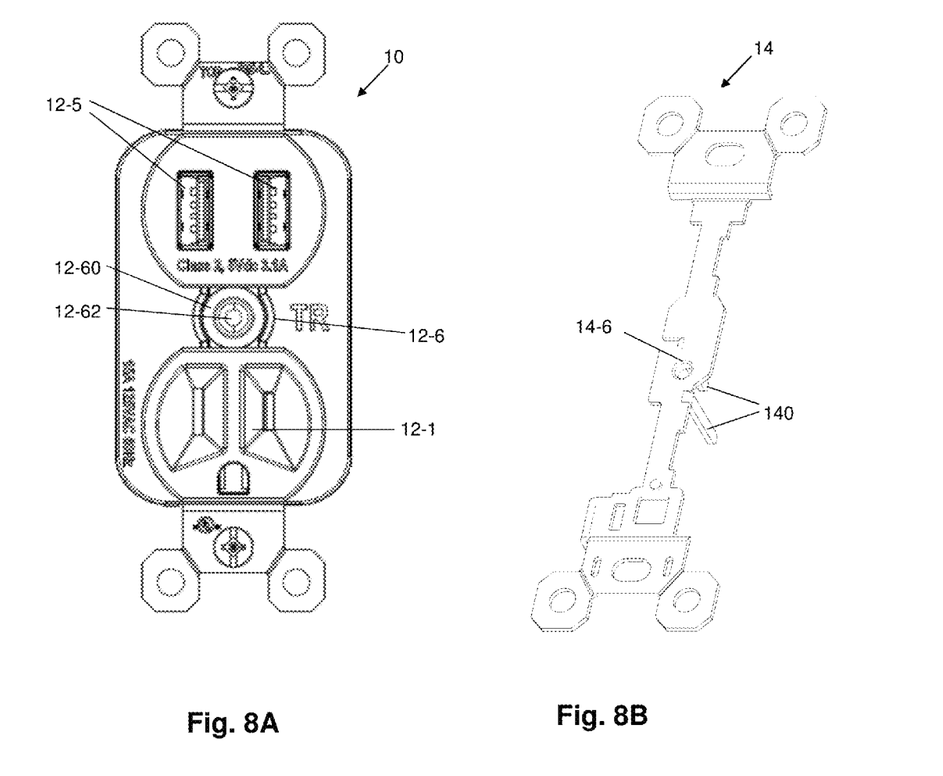
FIG. 8A is an isometric view of an electrical wiring device in accordance with an alternate embodiment of the present invention.
FIG. 8B is a detail view of the ground strap used in the device depicted in FIG. 8A.

Referring to FIG. 8A, an isometric view of an electrical wiring device in accordance with an alternate embodiment of the present invention is disclosed. The electrical wiring device 10 includes two types of user interfaces: there is a USB interface 12-5 disposed above an outlet receptacle interface 12-1. As before, a central screw hole 12-6 accommodates a center screw 12-60 that is used to connect the front cover 12 to the ground strap 14. (See ground strap screw-hole 14-6 in FIG. 3). The center screw 12-6 includes a center tapped portion that includes threads for the cover plate screw 12-60. This embodiment could employ the framework 140 shown in FIG. 3, or some other matrix 140 arrangement as described herein. Reference is made to U.S. Pat. No. 8,758,031, which is incorporated herein by reference as though fully set forth in its entirety, for a more detailed explanation of an electrical wiring device having a USB interface, an electric outlet interface or an electric switch interface.

FIG. 8B is a detail view of the ground strap used in the device depicted in FIG. 8A. As before, the shutter stabilization elements 140 are disposed in a three dimensional alignment with the screw 12-60 (not shown) and the screw hole 14-6 so that the housing (12/18) maintains rigidity when under installation misalignment stresses. The shutter stabilization structure (14-2, 12-60, and 140s) provides the shutters 12-2 with a dimensionally stable environment even in the presence of installation misalignment stresses.

Figure 9A:
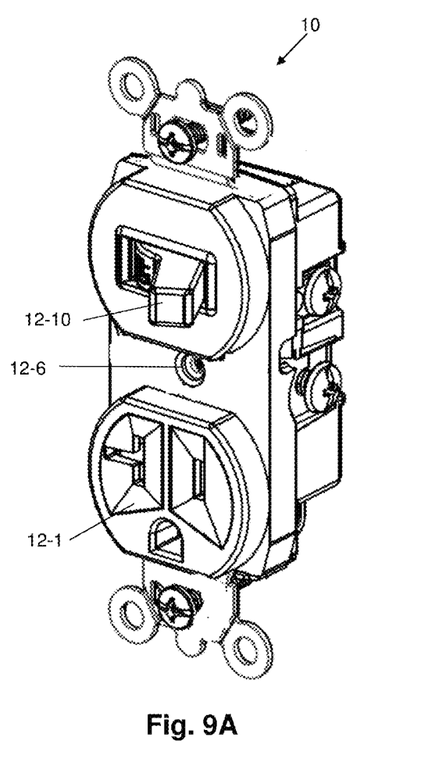
FIG. 9A is an isometric view of an electrical wiring device in accordance with an alternate embodiment of the present invention.

Referring to FIG. 9A, an isometric view of an electrical wiring device in accordance with an alternate embodiment of the present invention is disclosed. This electrical wiring device 10 also includes two types of user interfaces; there is a toggle switch interface 12-10 disposed above an outlet receptacle interface 12-1. As before, device 10 includes a central screw hole 12-6.

Figure 9B:
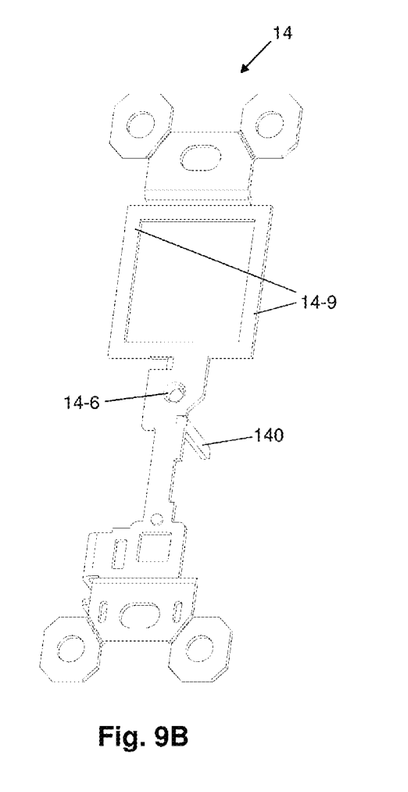
FIG. 9B is a detail view of the ground strap used in the device depicted in FIG. 9A.

FIG. 9B is a detail view of the ground strap 14 used in the device depicted in FIG. 9A. The ground strap 14 includes a relatively large switch opening structure 14-9 that is configured to accommodate the toggle switch 12-10 assembly. The switch opening structure 14-9 provides lateral stability in the x-y plane (See, e.g., FIG. 3). As before, the shutter stabilization elements 140 are disposed in a three dimensional alignment with the screw 12-60 so that the housing (i.e., cover 12 and back body 18) maintains rigidity when under installation misalignment stresses. Again, the shutter stabilization structure (14-2, 12-60, and 140s) provides the shutters 12-2 with a dimensionally stable environment even in the presence of installation misalignment stresses.

Figure 10:
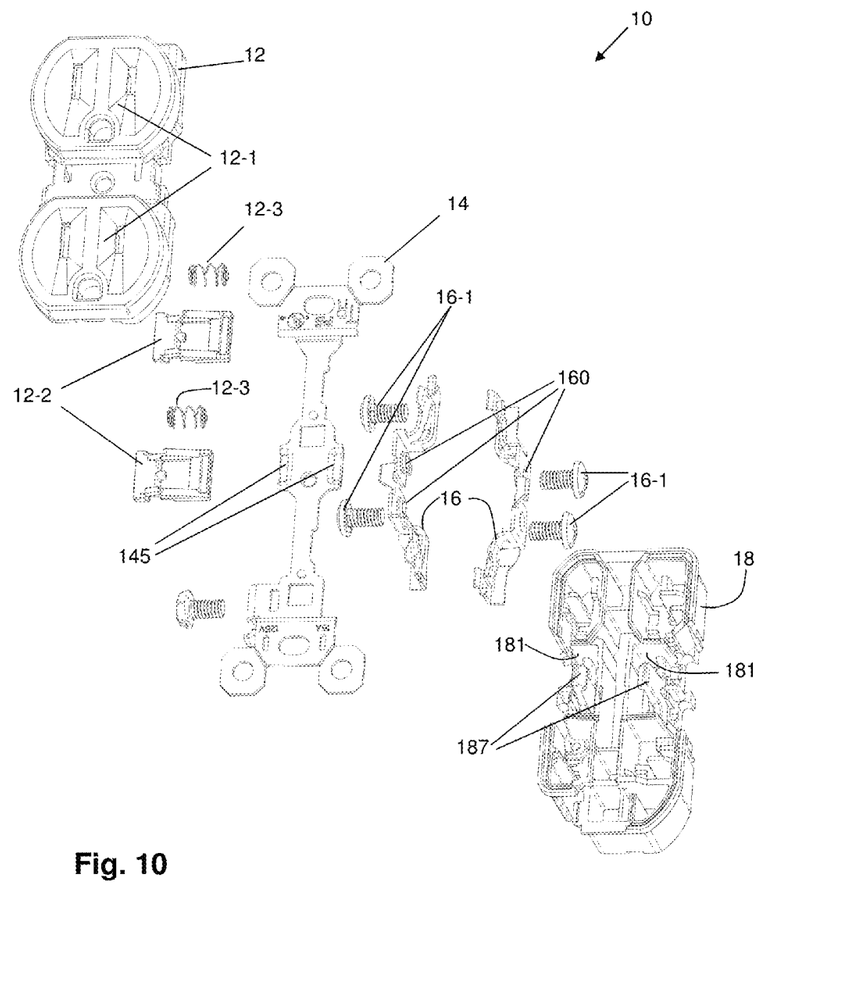
FIG. 10 is an exploded view of the electrical device in accordance with an alternate embodiment of the present invention.

As embodied herein and depicted in FIG. 10, an exploded view of the electrical device 10 in accordance with an alternate embodiment of the present invention is disclosed. This device is similar to the one depicted in FIG. 3 and thus the same reference numbers are used to refer to the same or like parts. Like the embodiment of FIG. 3, the ground strap 14 is leveraged to provide a support spine 14-3 for the framework 140. However, in this embodiment, the center portion of the spine 14-3 is equipped with wings or lateral projections 145. The lateral projections 145 are configured to mate with snap elements 187 formed in the interior of the back body 18 to provide the shutters 12-2 with a dimensionally stable environment even in the presence of installation misalignment stresses. Moreover, this embodiment may also include shutter stabilization elements 140 as described herein. The shutter stabilization elements are not shown in FIG. 10 for clarity of illustration.

Figure 11:
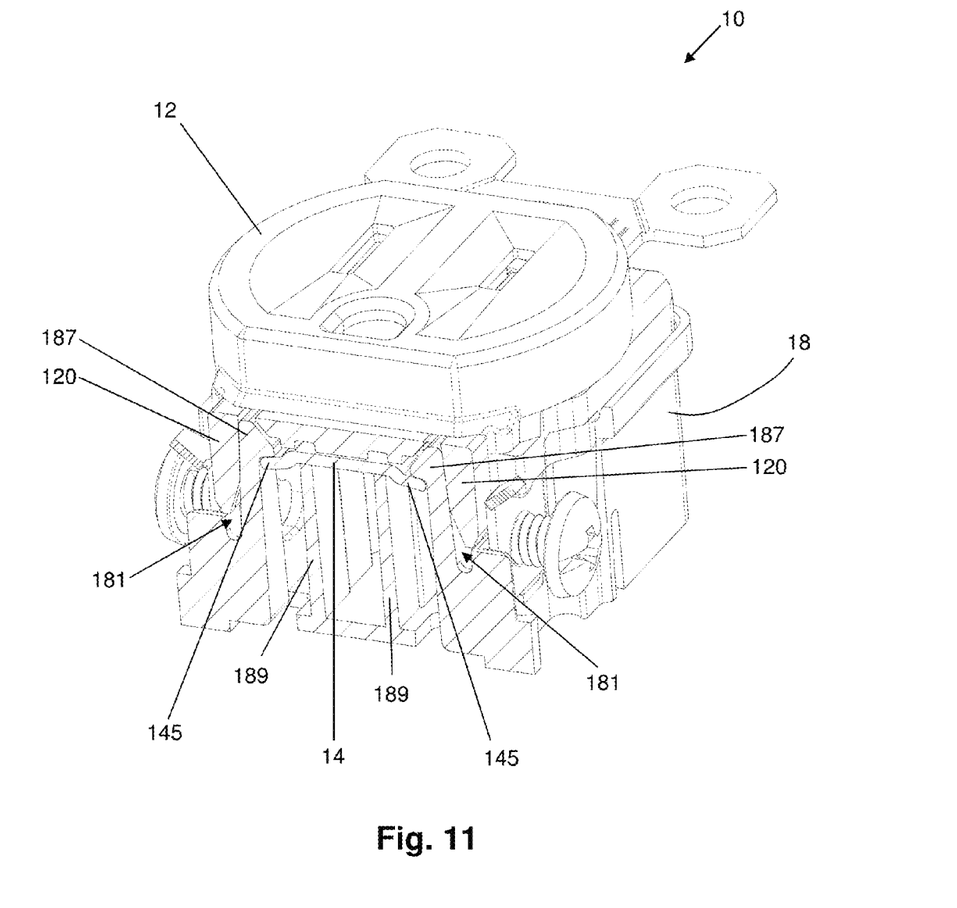
FIG. 11 is a detail cross-sectional view of the device depicted in FIG. 10.

Referring to FIG. 11, a detail cross-sectional view of the device 10 depicted in FIG. 10 is disclosed. In this view, the center of the ground strap 14 is supported by the parallel support walls 189 formed in the back body 18. The lateral projections 145 are recessed relative to the top major surface of the strap 14 in order to provide a bearing surface for the snap elements 187. The cover portion 12 includes side wall portions 120 that extend or snap into the wall wells 181 (see FIG. 10). The side wall portions exert an inwardly directed force against the snap elements 187 so that the snap elements are substantially fixed in place. Moreover, the overlapping nature of the side walls 120 and the snap elements 187 form a rigid stabilization structure that includes, and is reinforced by, the lateral projections 145 of the ground strap 14. When the device housing is assembled, the snap-elements 187 lock-in over the lateral projections 145.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. There is no intention to limit the invention to the specific form or forms disclosed, but on the contrary, the intention is to cover all modifications, alternative constructions, and equivalents falling within the spirit and scope of the invention, as defined in the appended claims. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrical wiring device configured to be mounted to or disposed in a device box, the electrical wiring device being further configured to accommodate a cover plate, the cover plate being affixed to the device by a fastening screw, the device comprising:

a device housing including a front cover having a user-accessible portion that includes a cover screw hole disposed in a center device portion, the cover screw hole being configured to accept the fastening screw, the user-accessible portion including at least one set of receptacle openings formed therein, the device housing also including a back body having a major rear surface;

an electrically conductive mounting strap disposed between the front cover and the back body, the mounting strap including a central strap portion and two mounting ears disposed at opposite ends of the mounting strap, the mounting ears being configured to mount or affix the device to the device box, the central portion having a strap screw-hole configured to accept the fastening screw;

an electrical circuit assembly including at least one set of electrical receptacle contacts having a hot receptacle contact and a neutral receptacle contact, the at least one set of electrical receptacle contacts being accessible via the at least one set of receptacle openings;

at least one shutter assembly disposed between the at least one set of receptacle openings and the at least one set of electrical receptacle contacts; and a shutter stabilization structure including at least one shutter stabilization element coupled to the central strap portion, the at least one shutter stabilization element being disposed proximate the strap screw-hole and interconnected with the back body to substantially reinforce the center device portion between the user-accessible portion and the major rear surface.

2. The device of claim 1, wherein an end portion of each shutter stabilization element is accessible via a pocket formed in the major rear surface of the back body.

3. The device of claim 2, wherein each stabilization element includes a connective tab portion that is configured to fasten the stabilization element to a portion of the pocket.

4. The device of claim 2, wherein each stabilization element includes a connective tab portion that includes a snap-in element configured to mate with a corresponding portion formed in the pocket.

5. The device of claim 1, wherein each shutter stabilization element extends through the back body to form a three-dimensional structure that is disposed between the user-accessible portion and the major rear surface.

6. The device of claim 5, wherein the at least one shutter stabilization element includes a balanced array of shutter stabilization elements that are aligned with the strap screw-hole and disposed askew with respect to a major longitudinal axis of the mounting strap.

7. The device of claim 6, wherein the balanced array of shutter stabilization elements includes three stabilization elements or four shutter stabilization elements.

8. The device of claim 6, wherein the balanced array of shutter stabilization elements are integrally formed with the central strap portion.

9. The device of claim 1, wherein the at least one shutter stabilization element is integrally formed with the central strap portion.

10. The device of claim 1, wherein the shutter stabilization structure includes a plurality of flexible post members formed in the back body, each of the plurality of flexible post members being coupled to a corresponding shutter stabilization element.

11. The device of claim 10, wherein the at least one shutter stabilization element include a first bearing lateral extension portion and a second bearing lateral extension portion disposed on opposite sides of the center strap portion, the first bearing lateral extension portion and the second bearing lateral extension portion being configured to mate with corresponding ones of the plurality of flexible post members.

12. The device of claim 1, wherein the at least one shutter stabilization element includes at least one first stanchion and at least one second stanchion connected to the center strap portion, the at least one first stanchion and at least one second stanchion being configured to mate with corresponding channels formed in the back body member to form a substantially balanced reinforcing array around the strap screw-hole.

13. The device of claim 1, wherein the at least one set of receptacle openings includes two sets of receptacle openings disposed at opposite ends of the device so that the fastening screw is disposed therebetween, and wherein the at least one set of electrical receptacle contacts includes two sets of electrical receptacle contacts.

14. The device of claim 1, wherein the user-accessible portion includes one set of receptacle openings and a user interface portion, the user interface portion being selected from a group of user interface portions that include a night light, a switch, a low voltage port, or a USB port.

15. The device of claim 1, wherein the central strap portion includes an aperture structure configured to accommodate a user-interface element disposed on the user-accessible portion.

16. The device of claim 15, wherein the aperture structure is configured to accommodate a toggle switch actuator.

17. The device of claim 1, wherein the at least one shutter assembly is configured to move between a closed position and an open position when the at least one shutter assembly is engaged by an electrical outlet plug that includes a hot plug blade and a neutral plug blade, the hot plug blade and the neutral plug blade being allowed to pass through the shutter assembly and mate with the hot receptacle contact and the neutral receptacle contact in the open position, and wherein the shutter assembly is configured to remain in the closed position when engaged by a foreign object that is inserted into one opening of the at least one set of receptacle openings.

18. The device of claim 1, wherein the shutter stabilization structure includes the fastening screw.

19. An electrical wiring device comprising:
a device housing including a front cover having a user-accessible portion that includes at least one set of receptacle openings formed therein, the device housing also including a back body having a major rear surface;
a mounting strap disposed between the front cover and the back body, the mounting strap including a central strap portion and two mounting ears disposed at opposite ends of the mounting strap;
an electrical circuit assembly including at least one set of electrical receptacle contacts, each set of electrical receptacle contacts including a hot receptacle contact and a neutral receptacle contact, the at least one set of electrical receptacle contacts being accessible via the at least one set of receptacle openings; and
a stabilization structure including a plurality of shutter stabilization elements coupled to the central strap portion and disposed in a substantially balanced array around the central strap portion, the plurality of shutter stabilization elements extending through the back body to form a three-dimensional reinforcing structure that rigidly interconnects the user-accessible portion and the major rear surface.

20. The device of claim 19, wherein the balanced array of stabilization elements includes at least two stabilization elements that are aligned with the strap screw-hole and disposed askew with respect to a major longitudinal axis of the mounting strap.

21. The device of claim 19, wherein the balanced array of stabilization elements includes three stabilization elements or four stabilization elements.

22. The device of claim 20, wherein each of the balanced array of stabilization elements are integrally formed with the central strap portion.

23. The device of claim 19, wherein an end portion of each stabilization element is accessible via a pocket formed in the major rear surface of the back body.

24. The device of claim 23, wherein each stabilization element includes a connective tab portion that is configured to fasten the stabilization element to a portion of the pocket.

25. The device of claim 23, wherein each stabilization element includes a connective tab portion that includes a snap-in element configured to mate with a corresponding portion formed in the pocket.

26. The device of claim 19, wherein the stabilization structure includes a plurality of flexible post members formed in the back body, each of the plurality of flexible post members being coupled to a corresponding stabilization element.

27. The device of claim 19, wherein the plurality of stabilization elements include at least one first stanchion and at least one second stanchion being connected to the center strap portion, the at least one first stanchion and at least one second stanchion being configured to mate with corresponding channels formed in the back body member to form the substantially balanced reinforcing array.

28. The device of claim 19, further comprising at least one shutter assembly disposed between the at least one set of receptacle openings and the at least one set of electrical receptacle contacts.

29. The device of claim 28, wherein the at least one shutter assembly is configured to move between a closed position and an open position when the at least one shutter assembly is engaged by an electrical outlet plug that includes a hot plug blade and a neutral plug blade, the hot plug blade and the neutral plug blade being allowed to pass through the shutter assembly and mate with the hot receptacle contact and the neutral receptacle contact in the open position, and wherein the shutter assembly is configured to remain in the closed position when engaged by a foreign object that is inserted into one opening of the at least one set of receptacle openings.

30. The device of claim 19, wherein the stabilization structure includes a fastening screw configured to be threaded into both a central screw formed in the front cover and a strap screw hole formed in the central strap portion.

31. The device of claim 19, wherein the shutter stabilization structure includes a plurality of flexible post members formed in the back body, each of the plurality of flexible post members being coupled to a corresponding shutter stabilization element.

32. The device of claim 31, wherein the at least one shutter stabilization element include a first bearing lateral extension portion and a second bearing lateral extension portion disposed on opposite sides of the center strap portion, the first bearing lateral extension portion and the second bearing lateral extension portion being configured to mate with corresponding ones of the plurality of flexible post members.

* * * * *